United States Patent Office 3,243,296
Patented Mar. 29, 1966

3,243,296
METHOD FOR STABILIZING DEVELOPED PHOTOSENSITIVE MATERIALS
Kintaro Nasu, Ashigarakami-gun, Kanagawa-ken, Tomiyasu Asai, Kanagawa-ken, and Katsumi Hayashi and Shunichiro Tsuchida, Ashigarakami-gun, Kanagawa-ken, Japan, assignors to Fugi Shashin Film Kabushiki Kaisha, Kanagawa-ken, Japan, a corporation of Japan
No Drawing. Filed Feb. 7, 1964, Ser. No. 343,208
Claims priority, application Japan, Feb. 18, 1963, 38/7,198
9 Claims. (Cl. 96—61)

This invention relates to a method for stabilizing developed photosensitive materials, and more particularly to a method for stabilizing the developed image without the two steps of fixing with sodium thiosulfate and washing with water.

The invention further relates to an improved composition for stabilizing developed photosensitive materials.

Fixing is carried out in order to remove silver halide in the non-exposed parts after development. However, because silver-thiosulfate complex formed during fixing is unstable to light, it is removed by washing with water.

Many complex-forming agents which are effective as stabilizers have been reported in technical literature H. D. Russel, B. C. Yackel, G. B. Bruce, PSA Journal Section B 1950 August, p. 59–62 disclose the use of alkali thiosulfates, alkali thiocyanates, ammonium thiosulfate and ammonium thiocyanate. Usually ammonium thiocyanate is used. In this case silver complex represented by the general formula $(NH_4)_xAg(CNS)_y$ is formed.

This salt is a transparent crystal and locates at white or transparent parts. Since this salt is stable to light it is unnecessary to remove it by washing with water (ref. British Patent No. 867,242, French Patent No. 1,206,359, No. 1,239,429 or No. 1,258,356). Such treatment for stabilization enables rapid development but is attended by many disadvantages in the quality of image. In order to ensure stability to light, the silver complex-forming agent is used in excess amount than the theoretical one. Because of the hygroscopic property of the agent, the surface of processed emulsion layer tends to become sticky. The silver complex-forming agent gradually oxidizes metallic silver constituting the image, converting it into silver complex and decreasing the density of image or vanishing the image. In other words, if photosensitive materials subjected to the stabilizing treatment are placed in air, the decrease in density, and the change in color from black to brown or yellow becomes remarkable with the lapse of time, and in an extreme case the image disappears. Such fading phenomenon is often observed when the material is maintained in high humidities. If the exposure is effected before the completion of reaction between unexposed silver halide and silver complex-forming agent, the photolysis of unstable silver complex salt and unstabilized silver halide occurs and the white part or the transparent part is contaminated.

In order to overcome these drawbacks, alkali metal- and ammonium-sulfite, bisulfite and pyrosulfite are used together with the silver complex salt-forming agent in the stabilizing solution.

The above-mentioned salts in form of a solution lose activity because of gradual oxidation by oxygen in air or water, and oxidation is more pronounced when they are kept in a tray with a large surface.

The fading of the image and the contamination of the white portion, therefore, easily occur in prints treated with a stabilizing solution which has been left in a processing bath for several days.

The present invention provides a method of preventing deterioration of the properties of the stabilizing solution, which comprises adding a compound represented by the following general formula into the above-mentioned stabilizing solution.

$$X_n—A_r—Y_m$$

wherein X and Y each represents —OH,

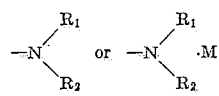

$n$ and $m$ each is a positive integer, the sum of them being a positive integer of from 2 to 3, M is an organic acid or an inorganic acid, $R_1$ and $R_2$ each represents hydrogen; a lower alkyl group having 1 to 5 carbon atoms; an aryl group; and alkyl group substituted by a hydroxyl group, a carboxyl group, a sulfo group, an amino group, and alkylamino group, an aryl group, a halogen, an alkylamide group, an alkyl sulfonamide group, or a heterocyclic residue; or an aryl group substituted by a hydroxyl group, a carboxyl group, a sulfo group, an amino group, an alkylamino group, an alkyl group, a halogen, or an alkoxy group; and $A_r$ represents unsubstituted benzene or naphthalene nucleus or those substituted by a lower alkyl group having from 1 to 8 carbon atoms, an aryl group, an alkoxy group, a carboxyl group, a carboalkoxy group, a thiol group, a sulfo group, a heterocyclic residue, a halogen, a nitro group, or an acyl group.

Compounds to be used in the present invention are used generally as a principal component for a developer or an oxidizing agent. The compounds include e.g.,
hydroquinone,
toluhydroquinone,
catechol,
chlorohydroquinone,
nitrohydroquinone,
phenylhydroquinone,
2-benzylthiotoluhydroquinone,
resorcinol,
o-phenyldiamine chloride,
N.N-dimethyl-P-phenylenediamine oxalate,
4-amino-3-methyl-N.N-diethylaniline,
4-amino-N-ethyl-N-(β-hydroxyethyl)aniline sulfate,
o or p-aminophenol,
N-(P-hydroxyphenyl)glycine,
N-oxy-P-aminophenol,
N-(P-hydroxyphenyl)-N-methylglycine,
N-methyl-aminophenolsulfate,
8-dihydroxynaphthalene,
P-aminosalicylic chloride,
4-amino-N-methyl-N-butylaniline,
4-phenylaminoaniline,
4-sulfoethylaminophenol,
4-amino-N-ethyl-N-(β-aminoethyl)aniline,
4-(ethyl-β-methylaminoethyl)aminoaniline,
4-amino-benzylaniline,
4-(β-chloroethyl)aminophenol,
4-amino-N-ethyl-N-(β-acetamide ethyl)aniline,
4-amino-N-(β-methylsulfonic amide ethyl)aniline,
4-amino-N-ethyl-N-tetrahydrofurfuryl aniline,
4-(4'-hydroxyphenyl)aminophenol,
4-(2'-carboxyphenyl)aminophenol,
4-(2'-sulfophenyl)aminoaniline,
4-(2'-sulfo-4'-aminophenyl)aminoaniline,
4-(4'-dimethylaminophenyl)aminoaniline,
4-(3'-methylphenyl)aminoaniline,
4-(2'-chlorophenyl)aminoaniline,
4-(4'-methoxyphenyl)aminoaniline,
2-benzylhydroquinone,
phenyl-catechol, pyrogallol monomethylether,
protocatechuic acid methyl ester,
2-benzylthiotoluhydroquinone,
1-amino-2-hydroxynaphthalene-6-sodium sulfonate,
N-(2,5-dihydroxyphenyl)pyridinium chloride,
2-acetylhydroquinone,
or mixtures of these compounds.

The above-mentioned compound may be added as a solution in water, a lower alcohol such as methanol, ethanol, isopropanol, etc., acetone, dioxane or the like. The amount is generally 0.1–10 g./l., preferably 0.5–3 g./l. based on the stabilizing solution.

The compound represented by the above-shown general formula may be used together with a heavy-metal salt having an activity for stabilizing the image by forming a soluble or insoluble complex salt with the silver complex salt-forming agent, for example, a salt of Ni, Co, Cd, Zn, or Au. Additionally or alternatively to the heavy metal salt there may be used one of the following organic compounds having the effect of preventing fading the image silver.

(1) 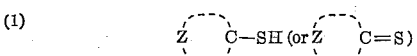

wherein

indicates an unsubstituted or substituted heterocyclic residue, such as, an imidazolyl group, a benzimidazolyl group, a thiazolyl group, a benzothiazolyl group, an oxazolyl group, a benzoxazolyl group, a triazolyl group, a thiadiazolyl group, an oxadiazolyl group, a 5-tetrazolyl group, a pyridyl group, a pyrimidinyl group, a pyrazinyl group, a pyridazinyl group, a triazinyl group, a thiodiazinyl group, or a condensation ring of them.

Typical examples of the above compounds are 2-mercapto imidazole, 2-mercapto benzimidazole, 5-carboethoxy-2-mercapto-4-methylthiazole, 2-mercaptobenzothiazole, 2-mercapto-oxazoline, 2-mercaptobenzoxazole, and 2-mercapto-5-methyloxadiazole.

The formula shown above in parenthesis means that the compound having formula

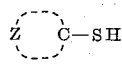

may take the formula in parenthesis as a result of tautomerism.

(2) 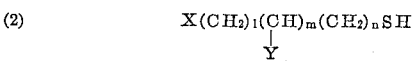

wherein X and Y each represent H, a hydroxyl group, an alkoxy group, an amino group, an alkyl-amino group, a carboxyl group, a carboalkoxy group, a thiol group, a sulfo group, a halogen, an alkyl group, an aryl group, or a heterocyclic residue and $l$, $m$ and $n$ each represents 0, 1 or 2, but the sum of them is not 0.

Typical examples of the above compounds are 2-mercaptoethanol, 1-thioglycerol, 2-mercaptoethyl chloride, 2-diethylaminoethane thiol chloride, thioglycol acid, and 2-mercaptopropionic.

(3) 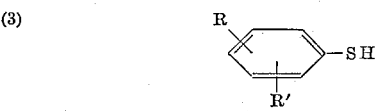

wherein R and R' each represents H, an alkyl group, a hydroxyl group, an alkoxy group, a thiol group, an amino group, an alkylamino group, a carboxyl group, a carboalkoxy group, a sulfo group, or a halogen. R and R' may be combined mutually and have a hetero atom in the combined chain.

Typical examples of the above-described compounds are thiophenol, 4-thiocresol, thiosalicylic acid, 1,3-dimercaptobenzene, 8-mercaptoquinoline, o-aminobenzenethiol chloride, and o-chlorothiophenol.

(4)                               R—SO$_2$SM wherein R is an alkyl group, an aryl group, an aralkyl group, or a heterocyclic residue; M is H, Na, K, or NH$_4$. Typical examples of the above-mentioned compounds are sodium ethylthiosulfonate, aminoethane thiosulfonate, sodium phenylthiosulfonate, and sodium paratoluene thiosulfonate.

5) 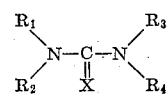

wherein $R_1$, $R_2$, $R_3$ and $R_4$ each represents H, an alkyl group, an aryl group, an aralkyl group, an acyl group, or a heterocyclic residue, and $R_1$ may be combined with $R_3$. X is S or Se.

Typical examples of the above-mentioned compounds are N-methylthiourea, N.N'-dimethylthiourea, ethylene thiourea, acetyl thiourea, N-ethyl-N'-diethyl thiourea, N-(2-thiazolyl)-N'-aryl-thiourea, N-(2-pyridyl)-N'-phenyl thiourea, and N.N'-dicyclohexyl selenourea and the like.

(6) 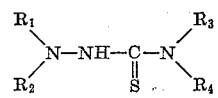

wherein $R_1$, $R_2$, $R_3$ and $R_4$ each represents H, an alkyl group, an aryl group, an aralkyl group, an acyl group, a heterocyclic residue, an alkylidene, or an arylidene. $R_1$ and $R_3$ may be combined with $R_2$ and $R_4$ respectively.

Typical examples of the said compounds are thiosemicarbazide, 1-phenylthiosemicarbazide, 4-ethylthiosemicarbazide, 4-ethylthiosemicarbazide, acetone thiosemicarbazone and benzaldehyde thiosemicarbazone.

Example 1

A photosensitive paper coated with a gelatin silver chloride emulsion containing hydroquinone was exposed to light, developed, and treated with the stabilizing solution having the following composition:

| | |
|---|---|
| Water (50° C.) ml | 500 |
| Ammonium thiocyanate g | 250 |
| Sodium bisulfite g | 70 |
| N-methyl-P-aminophenol sulfate g | 2 |
| 2-mercaptopropionic acid (1% methanol solution) ml | 60 |
| CoSO$_4$ g | 0.3 |

Water to make 1,000 ml.

The image stabilized with this solution showed good stability after drying. The effect due to the addition of the compound of the present invention was confirmed by the following experiment.

For comparison, two 1000 ml. of the stabilizing solutions, of which one contained the compound of the present invention and the other did not, were placed for 5 days in trays 6½ by 8½ inches. Thereafter, prints stabilized with both the solutions were kept under the moist condition of 80% R.H. at 50° C.

The results of the image density test after incubation and the analytical test for the amount of residual sodium bisulfate are shown in the following table.

| | Sodium bisulfite after 5 days (g./l.) | Decrease of density after 20 hours |
|---|---|---|
| Stabilizing solution containing no N-methyl-p-aminophenol sulfate | 31 | 0.71 |
| Stabilizing solution containing the above compound | 68 | 0.19 |

Example 2

A photosensitive paper coated with silver chloride was treated with a stabilizing solution having the following composition in the same way as in Example 1.

| | |
|---|---:|
| Water (50° C.) _____ml__ | 500 |
| Glacial acetic acid _____ml__ | 2 |
| Ammonium thiocyanate _____g__ | 300 |
| Sodium sulfite _____g__ | 100 |
| Toluhydroquinone _____g__ | 0.5 |
| 2-diethylaminoethane thiol chloride (1% aqueous solution) _____ml__ | 30 |
| $NiCl_2$ _____g__ | 5 |
| Water to make 1,000 ml. | |

The analytical amount of residual sodium sulfite under the same condition as in Example 1 and the result of the incubation test of stabilized prints are shown in the following table.

| | Amount of sodium sulfite after 5 days (g./l.) | Decrease of density after 20 hours |
|---|---|---|
| Stabilizing solution containing no toluhydroquinone | 62 | 0.63 |
| Stabilizing solution containing the above | 92 | 0.15 |

Example 3

A photosensitive paper coated with silver chloride was treated with a stabilizing solution having the following composition in the same way as in Example 1.

| | |
|---|---:|
| Water (50° C.) _____ml__ | 500 |
| Ammonium thiocyanate _____g__ | 270 |
| Potassium pyrosulfite _____g__ | 130 |
| P-hydroxyphenylglycine _____g__ | 1 |
| 2-mercaptobenzimidazole (0.4% methanol solution) _____ml__ | 60 |
| $NiCl_2$ _____g__ | 5 |
| Water to make 1,000 ml. | |

The result of the analytical test for the amount of residual potassium pyrosulfite under the same conditions as in Example 1 and the result of the incubation test of stabilized prints are shown in the following table.

| | Amount potassium pyrosulfite after 5 days (g./l.) | Decrease of density after 20 hours |
|---|---|---|
| Stabilizing solution not containing P-hydroxyphenylglycine | 75 | 0.79 |
| Stabilizing solution containing the above | 100 | 0.20 |

What is claimed is:

1. A process for stabilizing a developed unfixed photosensitive material which comprises treating said developed unfixed photosensitive material with an aqueous solution containing (1) a silver complexing agent selected from the group consisting of alkali metal thiosulfates, ammonium thiosulfate, alkali metal thiocyanates, and ammonium thiocyanate; (2) a member selected from the group consisting of alkali metal sulfites, ammonium sulfite, alkali metal bisulfites, ammonium bisulfite, alkali metal pyrosulfites, and ammonium pyrosulfite; and (3) a compound having the general formula $$X_n-Ar-Y_m$$

wherein X and Y each represents a member selected from the group consisting of —OH,

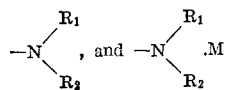

(where M represents a member selected from the group consisting of an organic acid and an inorganic acid and $R_1$ and $R_2$ each represents a member selected from the group consisting of (a) a hydrogen atom; (b) a lower alkyl group having 1 to 5 carbon atoms; (c) an aryl group; (d) an alkyl group substituted by at least a member selected from the group consisting of a hydroxyl group, a carboxyl group, a sulfo group, an amino group, an alkylamino group, an aryl group, a halogen atom, an alkylamide group, an alkylsulfonamide group, and a heterocyclic ring; and (e) an aryl group substituted by at least a member selected from the group consisting of a hydroxyl group, a carboxyl group, a sulfo group, an amino group, an alkylamino group, an alkyl group, a halogen atom, and an alkoxy group); wherein Ar represents a member selected from the group consisting of unsubstituted benzene nucleus, unsubstituted naphthalene nucleus, and benzene and naphthalene nuclei substituted by a member selected from the group consisting of a lower alkyl group having 1 to 8 carbon atoms, an aryl group, an alkoxy group, a carboxyl group, a carboalkoxy group, a thiol group, a sulfo group, a heterocyclic ring, a halogen atom, a nitro group, and an acyl group; and $n$ and $m$ each represents a positive integer, the sum of said $n$ and $m$ being from 2 to 3.

2. A process according to claim 1 wherein the stabilizing solution contains 0.1–10 gm. of the compound having the general formula $X_n-Ar-Y_m$ per liter.

3. A process according to claim 2 wherein the stabilizing solution contains 0.5–3 gm. of the compound having the general formula $X_n-Ar-Y_m$ per liter.

4. The process as claimed in claim 1 wherein said solution further contains a compound having the general tautomeric formulas

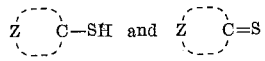

wherein

represents a member selected from the group consisting of an unsubstituted heterocyclic residue and a substituted heterocyclic residue.

5. The process as claimed in claim 1 wherein said solution further contains a compound having the general formula

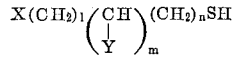

wherein X and Y each represents a member selected from the group consisting of hydrogen, an alkoxy group, an amino group, an alkylamino group, a carboxyl group, a carboalkoxy group, a thiol group, a sulfo group, a halogen, an alkyl group, an aryl group, and a heterocyclic residue; $l$, $m$ and $n$ each represents 0 or a positive integer of from 1 to 2 but the sum of $l$, $m$ and $n$ is not 0.

6. The process as claimed in claim 1 wherein said solution further contains a compound having the general formula

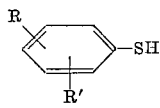

wherein R and R' each represents a member selected from the group consisting of hydrogen, an alkyl group, a hydroxyl group, an alkoxy group, a thiol group, an amino group, an alkylamino group, a carboxyl group, a carboalkoxy group, a sulfo group and a halogen.

7. The process as claimed in claim 1 wherein said solution further contains a compound having the general formula

R—SO$_2$SM wherein R represents a member selected from the group consisting of an alkyl group, an aryl group, an aralkyl group, and a heterocyclic residue and M represents a member selected from the group consisting of H, Na, K and NH$_4$.

8. The process as claimed in claim 1 wherein said solution further contains a compound having the general formula

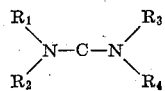

wherein R$_1$, R$_2$, R$_3$ and R$_4$ each represents a member selected from the group consisting of hydrogen, an alkyl group, an aryl group, an aralkyl group, an acyl group and a heterocyclic residue and X represents a member selected from the group consisting of S and Se.

9. The process as claimed in claim 1 wherein said solution further contains a compound having the general formula

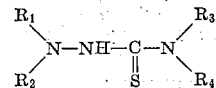

wherein R$_1$, R$_2$, R$_3$, and R$_4$ each represents a member selected from the group consisting of hydrogen, an alkyl group, an aryl group, an aralkyl group, an acyl group, a heterocyclic residue, an alkylidene and an arylidene.

References Cited by the Examiner

UNITED STATES PATENTS

| | | | |
|---|---|---|---|
| 2,230,977 | 2/1941 | Ham | 96—61 |
| 2,759,825 | 8/1956 | Land | 96—29 |
| 2,782,120 | 2/1957 | Goldhammer et al. | 96—61 |
| 3,120,795 | 2/1964 | Land | 96—61 |

FOREIGN PATENTS

| | | |
|---|---|---|
| 1,204,273 | 1/1960 | France. |
| 776,082 | 6/1957 | Great Britain. |

NORMAN G. TORCHIN, *Primary Examiner.*

C. E. DAVIS, *Assistant Examiner.*